Aug. 18, 1931.  M. F. SULLIVAN  1,819,046
GAUGE FOR FABRIC CUTTING MACHINES
Filed Oct. 19, 1929
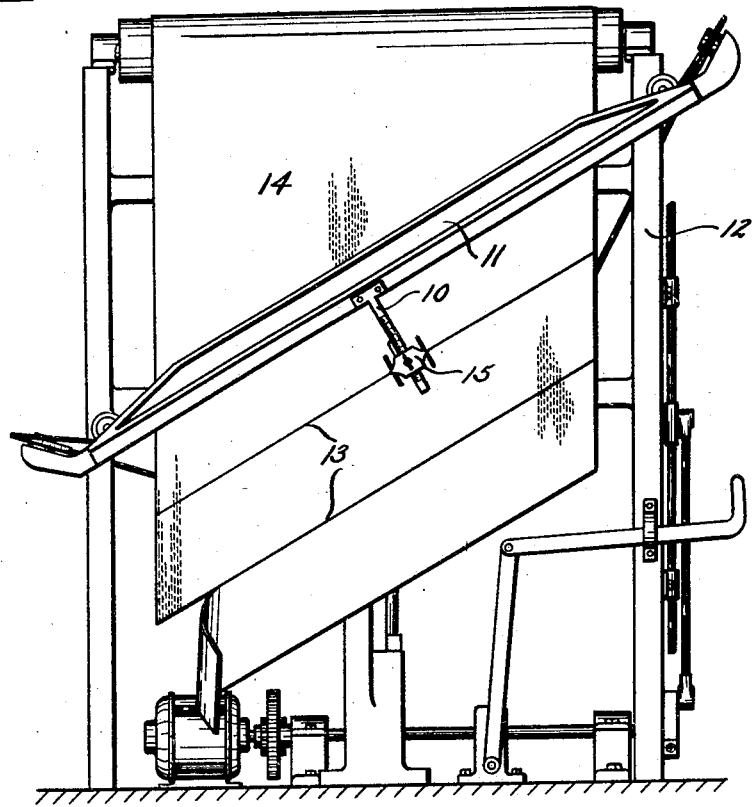
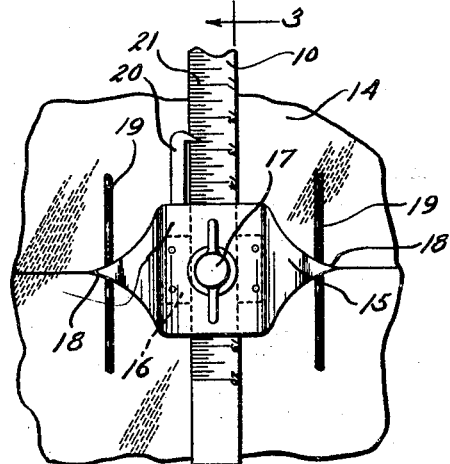
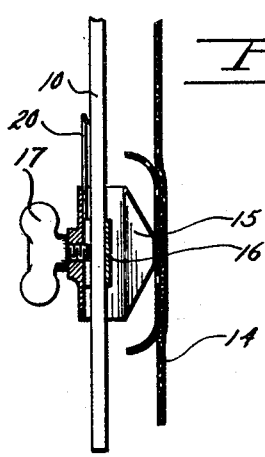
INVENTOR.
Michael F. Sullivan.
BY
ATTORNEY.

Patented Aug. 18, 1931

1,819,046

UNITED STATES PATENT OFFICE

MICHAEL F. SULLIVAN, OF CHICOPEE FALLS, MASSACHUSETTS, ASSIGNOR TO THE FISK RUBBER COMPANY, OF CHICOPEE FALLS, MASSACHUSETTS, A CORPORATION OF MASSACHUSETTS

GAUGE FOR FABRIC CUTTING MACHINES

Application filed October 19, 1929. Serial No. 400,816.

My invention relates to a gauge for use on fabric cutting machines and is adapted to indicate the width of relatively narrow strips of the cut material.

The gauge is shown used on a vertical bias cutter although it may be equally well adapted for use on horizontal machines and on machines cutting the fabric at right angles to the run of material.

In cutting fabric or cord material, especially that used in the rubber industry for the manufacture of pneumatic tires where the stock is impregnated with rubber compositions, the material must be frequently checked as to the width of the cut stock since a small variation will tend to make the construction of a tire imperfect.

The object of my invention is to provide a device for easily and constantly checking the width of strips as they are cut from a web of fabric material.

In the accompanying drawings which illustrate one embodiment of my invention,

Fig. 1 is a front elevation of a vertical bias cutter showing my gauge in position;

Fig. 2 is a view, at a larger scale, of the gauge;

Fig. 3 is a view taken substantially on line 3—3 of Fig. 2; and

Fig. 4 is an end view of the gauge.

In the drawings, a gauge bar 10 is fixed to a frame portion 11 of a bias cutter 12 in such a manner that the gauge bar 10 will lie at right angles to cuts 13 in rubberized fabric 14. A member 15 slidably mounted on the bar 10 by means of a bracket 16 fixed to the member 15 is locked in place on the bar 10 by a thumb-screw 17 carried by member 15. This member is formed to present sharp indicating points 18 and is bent so as to bring these points adjacent the material 14. A pair of wires 19 are secured to member 15 just behind the points and are adapted to have the material ride beneath them, thus preventing any tendency of the material to catch on the points 18.

An indicator 20 on the member 15 is associated with graduations 21 on the bar 10 to assist in adjusting the member 15 to the desired setting.

In operation the gauge is set to indicate the desired width strips to be cut and the cutter 12 is adjusted so as to bring the cut 13 directly beneath the points 18 of member 15. During the operation of the machine, as the feed of the material is momentarily halted as the cut is made, the machine operator may glance at the gauge and thus maintain a constant check on the width of the cut.

While I have shown the invention applied to a cutting operation in which the strips are retained in web form to be subsequently separated it is, of course, equally applicable to a cutting operation where a completely separating cut is made.

Having thus described my invention, I claim:

1. In a fabric cutting machine, means to indicate a variance from the desired width of cut which comprises a bar, a visual indicator slidably mounted on the bar and adapted to be locked thereto, and means carried by the indicator to permit the indicator to ride freely over the material to be gauged.

2. In a fabric cutting machine, means to indicate a variance from the desired width of cut which comprises a bar one end of which is secured in a fixed relation to the line of cut, a member adjustably fixed to the bar, said member comprising visual indicating means normally registering with the advanced edge of the strip being cut as the cutter operates, and means associated with the indicating means to prevent the latter from engaging with the material.

3. In a fabric cutting machine, means to indicate a variance from the desired width of cut which comprises a bar secured in a fixed relation to the line of cut, a visual indicator slidably mounted on the bar and adapted to be locked thereto, graduations on the bar by which the indicator may be set, and means carried by the indicator to permit the indicator to ride freely over the material to be gauged.

4. In a fabric cutting machine, means to indicate a variance from the desired width of cut which comprises a bar at right angles to the line on which the material is cut, a member adjustably fixed to the bar, said member comprising visual indicating means normally registering with the advanced edge of the strip being cut as the cutter operates, and means associated with the indicating means to prevent the latter from engaging with the material.

5. A gauge for use with a fabric cutting machine which comprises a gauge bar, a visual indicator slidably mounted on the bar and adapted to be locked thereto, and means carried by the indicator to permit the indicator to ride freely over the material to be gauged.

6. A gauge for use with a fabric cutting machine which comprises a gauge bar which is adapted to be secured in a fixed relation to the line of cut, a member adapted to be adjustably fixed to the bar and comprising visual indicating means adapted to normally register with the advanced edge of the strip being cut as the cutter operates, and means associated with the indicating means to prevent the latter from engaging with material being cut.

7. A gauge for use with a fabric cutting machine which comprises a gauge bar which is adapted to be secured in a fixed relation to the line of cut, a member adapted to be adjustably fixed to the bar and comprising visual indicating means adapted to normally register with the advanced edge of the strip being cut as the cutter operates, graduations on the bar by which the indicator may be set to specified width, and means associated with the indicating means to prevent the latter from engaging with material being cut.

MICHAEL F. SULLIVAN.